United States Patent
Massold et al.

(10) Patent No.: US 10,601,055 B2
(45) Date of Patent: Mar. 24, 2020

(54) FILTER

(71) Applicants: Andreas Massold, Balingen (DE); Frank Sommer, Balingen (DE)

(72) Inventors: Andreas Massold, Balingen (DE); Frank Sommer, Balingen (DE)

( * ) Notice: Subject to any disclaimer, the term of this patent is extended or adjusted under 35 U.S.C. 154(b) by 236 days.

(21) Appl. No.: 15/671,027

(22) Filed: Aug. 7, 2017

(65) Prior Publication Data
US 2017/0358807 A1     Dec. 14, 2017

Related U.S. Application Data

(62) Division of application No. 14/268,297, filed on May 2, 2014, now abandoned.

(30) Foreign Application Priority Data

Oct. 11, 2013 (EP) ..................................... 13004899

(51) Int. Cl.
| | |
|---|---|
| *H01M 8/0273* | (2016.01) |
| *B01D 46/00* | (2006.01) |
| *H01M 8/0267* | (2016.01) |
| *B01D 46/10* | (2006.01) |
| *B01D 29/01* | (2006.01) |
| *H01M 8/0286* | (2016.01) |

(52) U.S. Cl.
CPC ........ *H01M 8/0273* (2013.01); *B01D 29/012* (2013.01); *B01D 46/0001* (2013.01); *B01D 46/10* (2013.01); *H01M 8/0267* (2013.01); *H01M 8/0286* (2013.01); *B01D 2201/342* (2013.01); *B01D 2271/022* (2013.01)

(58) Field of Classification Search
CPC ............. H01M 8/0273; H01M 8/0267; H01M 8/0276; H01M 8/0286; B01D 29/012; B01D 46/0001; B01D 46/10; B01D 2271/022; B01D 2201/342
See application file for complete search history.

(56) References Cited

U.S. PATENT DOCUMENTS 2,599,604 A * 6/1952 Bauer .................. B01D 25/001
                                                              210/494.1

* cited by examiner

*Primary Examiner* — Krishnan S Menon
*Assistant Examiner* — Waqaas Ali
(74) *Attorney, Agent, or Firm* — Von Rohrscheidt Patents

(57) ABSTRACT

The invention relates to a filter with a gasket applied in line shape at an edge of the filter. The invention suggests to apply the gasket with a nozzle which facilitates a gasket that is thinner and/or whose protrusion beyond the filter is lower than this would be feasible for example through injection molding.

19 Claims, 2 Drawing Sheets

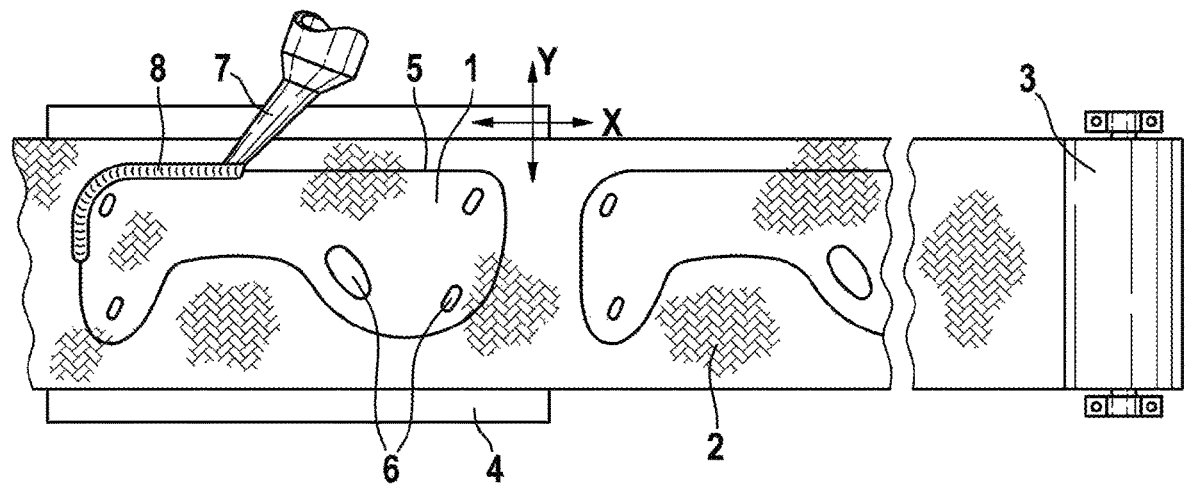
FIG. 1
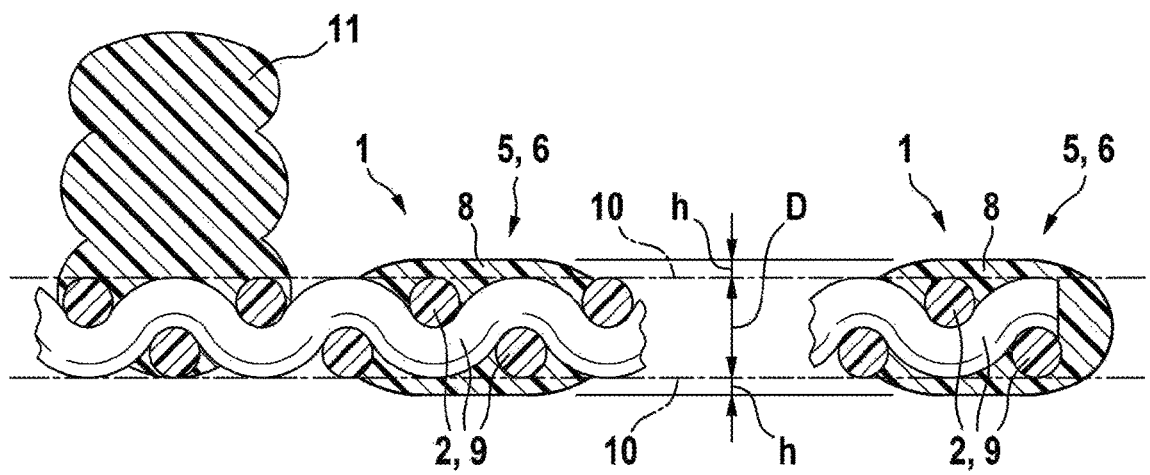
FIG. 2a  FIG. 2b

FILTER

RELATED APPLICATIONS

This application is a Divisional of application Ser. No. 14/268,297 filed on May 2, 2014 which claims priority from European patent application EP 13 004 899.4 filed on Oct. 11, 2013, both of which are incorporated in their entirety by this reference.

FIELD OF THE INVENTION

The invention relates to a filter with and/or a frame.

BACKGROUND OF THE INVENTION

The term filter in this context relates to a filter medium that is thin relative to its length and width, for example a woven material, a warp knitted material, a knitted material or a fleece whose fibers are for example made from metal, plastic or glass. The enumerations are exemplary and not complete. The filter can be flat or have a three dimensional shape, it can be for example zigzag shaped, meander shaped, cylinder or frustum shaped or two dimensionally cambered.

The filter includes a preferably linear gasket, in particular along an edge of the filter, wherein the gasket can also be flat. The edge can be an outer edge, or when the filter includes one or plural holes, an inner edge. The gasket can also extend within the filter at a distance from edges of the filter. The gasket is made in particular from an engineered plastic material with long term elasticity, for example an elastomeric material, a hard plastic material, a polyamide, a polyester, for example fluor silicone for a an oil filter or for example polypropylene as a carrier and not necessarily as a filter of a membrane for a fuel cell. Thus, the enumeration is exemplary and not complete. The gasket is in particular a solid material, thus not a foam, this means it does not include any intentional pores, gas inclusions, voids or similar cavities.

Instead of the gasket or in addition to the gasket the filter can include a frame which provides additional stability to the filter.

It is known for example to glue on or otherwise apply a prefabricated gasket to a filter. It is also possible to apply a gasket at a filter through injection molding, wherein the filter is inserted into an injection mold. Injection molding requires an injection molding tool which includes a shape of a seal to be produced as an empty space which is designated as a cavity. In order for a plasticized compound to completely fill the cavity during injection molding a sufficient cross section of the cavity is required which is also a function of the flow length of the cavity. A height of 400 µm of the cavity is considered as a lower practical limit for plastic injection molding today in case surfaces which come in contact with the plasticized plastic material during injection molding are smooth. In case there is a woven material, a fleece or a similar filter medium in the cavity, the cavity has to be substantially taller due to the brake effect of the filter medium, at least two to three times the height of the cavity is required. The filter medium does not only slow down the plasticized plastic material that is injected into the cavity under pressure, but the flowing plastic material pushes fibers of the filter medium in front of itself and squashes the fibers so that they block the cavity.

BRIEF SUMMARY OF THE INVENTION

Thus, it is an object of the invention to provide a filter with a gasket wherein a small height of the gasket shall be provided. The height of the gasket designates its protrusion over a top surface or top surface of the filter, thus an imaginary surface which contacts fibers of the filter at their extremities.

The object is achieved according to the invention through a filter including a gasket, wherein the gasket is applied to the filter through master forming without a molding tool.

According to the invention the gasket is produced through master forming without a molding tool and simultaneously attached at the filter or integrally formed at the filter. Without a molding tool means that no forming tool like a casting mold or injection mold is used which includes the shape of the gasket to be produced as an empty space, this means as a cavity neither an entirety of the gasket nor a section of the gasket.

The invention facilitates a thin and flat gasket because a plasticized gasket material does not have to flow through a cavity during forming which requires a minimum thickness or minimum height of the gasket. Scrap through early congealing of a plasticized gasket compound or through penetration of the gasket compound into an injection molding tool into portions of the filter which shall not include a gasket is prevented.

Instead of the gasket or in addition to the gasket the filter can include a frame which provides more or less stability to the filter. The gasket can simultaneously also form a frame which stabilizes the filter. The filter can also include stabilizing struts or grids or similar within its surface. According to the invention the frame is applied through master forming without a molding tool like the gasket.

An advantageous embodiment of the invention provides that the gasket is applied to the filter with a nozzle. Another embodiment of the invention provides printing of the gasket. A nozzle typically facilitates applying the gasket in one run with a desired thickness at the filter, wherein plural runs are feasible for a greater width and/or height of the gasket. The nozzle can be a forming nozzle, this means an outlet of the nozzle has a contour that corresponds to a cross section of the gasket to be master formed, optionally also in consideration of a shrinkage or a swelling of the gasket material. The gasket, however, can also be applied to the filter with a regular, for example frustum shaped flat or taper cut nozzle which forms plasticized gasket material into a bead which penetrates the filter and forms a line shaped sealing bead on a top side and/or on a bottom side of the filter.

A gasket material is useable which can be applied to the filter at room temperature. Advantageously the gasket material is heated and applied to the filter with a nozzle that is temperature controlled by water, electrical power or in another manner. The gasket material in this case is for example a plasticized duroplastic or thermoplastic material or a thermally cross linked plastic material like for example silicone.

Through printing the gasket can be applied in one or plural layers for a greater thickness or height of the gasket. As a matter of principle all known printing methods are useable to apply the gasket to the filter, thus for example letter press printing, flat printing, gravure printing, screen printing, flexo- or offset printing. During printing methods like screen printing or flexo printing in which the gasket medium is applied in dots, care has to be taken that the gasket medium flows far enough so that the dots unite in order to provide a continuous gasket without openings. During application with a nozzle and also during printing of the gasket the gasket material penetrates the filter medium so that the gasket material encloses fibers of the filter medium without pass through openings. It is another advantage of the invention that the gasket material applied to the filter medium through master forming penetrates the filter medium and encloses the fibers of the filter so that the fibers of the filter are supported. When the filter is cut along the gasket after applying the gasket through master forming the gasket supports filter fibers at an edge of the filter and prevents that short fiber pieces of the filter migrate into a medium to be filtered.

When the gasket is applied to an outer or inner edge of the filter an embodiment of the invention provides that the gasket reaches around the edge of the filter, this means the gasket forms a type of frame for the edge of the filter. This embodiment of the invention improves a sealing effect and prevents a disengagement of the short fibers that are generated through cutting the fibers at the edge of the filter.

A configuration of the filter provides that the filter contacts a support while the gasket is applied, wherein the support includes a recess like a channel in the portion of the gasket to form a line shaped gasket. This configuration of the invention facilitates applying a gasket at the filter wherein the gasket penetrates the filter and extends on both sides over the surfaces or main surfaces of the filter.

An embodiment of the invention provides that the filter forms a carrier for a membrane, for example for a fuel cell. The filter serves in this case as a mechanical carrier for the membrane and does not necessarily have the function of a filter.

An embodiment of the invention provides a height of the gasket over a surface or main surface of the filter of approximately 500 μm or less, advantageously approximately 200 μm or less, and particularly advantageously approximately 20 μm or less. As a matter of principle the invention facilitates a gasket with any small height above the surface or main surface of the filter, starting with zero height.

An embodiment of the invention provides a three dimensionally formed filter. Thus, a flat or mono dimensionally cambered, for example rolled filter, is formed into a for example cambered element for example through a type of three dimensional draw forming after applying the gasket.

An embodiment of the invention provides that at least one protrusion is applied to the filter through master forming without a molding tool like the gasket wherein the protrusion is taller than the gasket. The protrusion can be made from the same material as the gasket. The at least one protrusion can include at least one base or spacer for positioning or installing the filter or for gripping the filter, in particular for automated gripping of the filter for example with a robot for handling the filter, for example when packing or unpacking or installing the filter. The protrusion may have a height of one or plural mm above a surface or top surface of the filter. If the protrusion cannot can be applied at the filter in one pass through or layer due to its height, it can be applied through multiple applications for example with a nozzle or through printing in a respective number of layers.

BRIEF DESCRIPTION OF THE DRAWINGS

The invention is now described in more detail based on an embodiment with reference to drawing figures, wherein:

FIG. 1 illustrates a top view of a filter according to the invention;

FIGS. 2 a, b illustrate sectional views of the filter according to FIG. 1, in a portion of a gasket in a enlarged depiction;

DETAILED DESCRIPTION OF THE INVENTION

Figure 3:
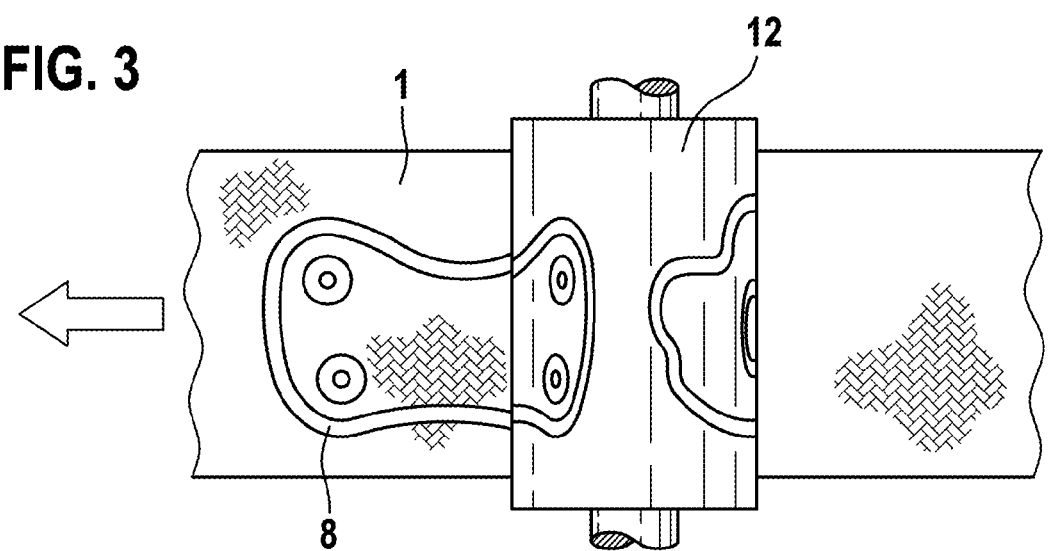
FIG. 3 illustrates a second embodiment of the invention.

The filter 1 according to the invention illustrated in FIG. 1 includes a fabric 2 made from plastic material fibers which is advantageously mechanically pulled off from a storage roll 3 and laid onto a CNC controlled table 4 that is moveable in X-direction and in Y-direction, this means longitudinally and transversally to the fabric 2, wherein the table forms a support surface for the filter 1 for applying a gasket 8. Instead of the fabric also a knitted material, a warp knitted material or a fleece can be used. Instead of being made from plastic material the fibers can also be made from glass, metal carbon material or stone or mixes thereof. An outer edge 5 and inner edges 6 of the filter 1 are illustrated in FIG. 1 with lines. The inner edges 6 enclose holes in the filter 1 for example for pass thru openings or threaded connections of a filter or machine housing that is not illustrated and which includes a separation plane in which the filter 1 is arranged.

With a nozzle 7 which is tilted sideways by 90° in FIG. 1 and which is arranged in a perpendicular plane at a slant angle or perpendicular to the filter 1 or to the table 4 a gasket material is applied to the filter 1 along the edges 5, 6. The gasket material is applied in a paste form and forms a permanently elastic line shaped gasket 8 along the edges 5, 6 of the filter 1 after curing. The gasket 8 can also be applied flat and/or inside the filter 1 and not only at the edges 5, 6 (not illustrated). As apparent from the sectional view of FIG. 2a the gasket 8 penetrates the woven material 2 of the filter 1 and encloses its fibers 9 so that a tight seal without pass thru openings is formed between the fibers 9. The gasket 8 is thin. In the instant embodiment it only protrudes by approximately 20 μm above a surface or top surface 10 of the filter 1. The surface or top surface 10 is an imaginary surface which contacts the fibers 9 of the fitters 1 at their extremities. In the embodiment the filter 1 has a thickness D of approximately 150 μm wherein the protrusion of the gasket 8 which is designated as h is not proportional to the thickness D of the filter 1 but as a matter of principle independent from the thickness D of the filter 1. The protrusion h of the gasket 8 over the top or cover surface 10 of the filter 1 can also be smaller, as a matter of principle it can be anywhere between 0, a couple of μm, a couple of 10 μm or a couple of 100 μm tall.

In the described embodiment of the invention the nozzle 7 is temperature controlled, for example water temperature controlled for applying for example silicone or for example electrically temperature controlled for applying for example thermo plastic material. In order to apply the gasket material to the filter 1 the gasket material is heated and plasticized in case it is not flow capable by itself and applied to the filter 1 with the nozzle 7 that is temperature controlled through water, electricity or in another manner. The gasket material is for example a plasticized duro plastic material or thermoplastic material, an elastomeric material or a thermally cross linked plastic material like for example silicone. However, the invention does not exclude a gasket material that can be applied to the filter 1 with a non temperature controlled nozzle 7 at room temperature.

As stated supra the table 4 includes a support for the filter 1 for applying the gasket 8 and it includes a channel along edges 5, 6 of the gasket 8 so that a protrusion of the gasket 8 also forms at a bottom side of the filter 1 over the surface or top surface of the gasket 8. The height h of the gasket 8 over the surface or top surface of the filter 1 can have identical sizes or different sized on both sides of the filter 1. Applying the gasket 8 with the with the nozzle 7 facilitates a gasket 8 which is thinner or whose protrusion h over the surface or top surface 10 of the filter 1 is smaller than it would be feasible through injection molding of a gasket in an injection molding tool.

After applying the gasket 8 the inner edges 6 are cut and the filter 1 is cut out along the outer edge 5. The edges 5, 6 of the filter 1 are cut within the gasket 8. The gasket 8 fixates the fibers 9 at the edges 5. 6 and prevents that short fiber pieces generated through the cutting operation separate from the filter 1 during use.

When the gasket 8 is applied at an edge of the filter 1, when the filter 1 is cut or stamped before applying the gasket 8, the gasket 8 encloses the edge of the filter 1 as apparent from FIG. 2b.

As evident in FIG. 2a on the left side the gasket material or another mass can also be built up higher than the gasket 8 to form protrusions 11. The protrusions 11 can be produced for example through multiple applications of gasket material or another compound in a straight or helical movement of the nozzle 7 oriented away from the filter 1. The protrusions 11 can be for example bases configured as spacers or for orienting the filter 1 or for automatically handling the filter 1 with a non illustrated robot.

After applying the gasket 8 through application with the nozzle 7 or imprinting, the filter 1 can be cambered through a deep drawing operation, this means through three dimensional shaping (not illustrated).

FIG. 3 illustrates a gasket 8 alternatively onto a filter 1 applied through printing for example with a printing roller 12. Instead of printing ink gasket material is applied to the filter 1 which as described with reference to FIGS. 1 and 2 penetrates the filter 1 and encloses the fibers of the filter 1 hermetically tight. In order to obtain greater thickness of the gasket 8 the gasket material can be printed onto the filter 1 several times, that means in layers. As a matter of principle all printing methods like letter press printing, flat printing, gravure printing, screen printing, flexo- or offset printing are feasible, wherein for printing methods which print individual dots (pixels) a method parameter like flow ability of the gasket material and its imprint on and into the fabric of the filter 1 shall be selected so that the individual printed dots flow into one another and a continuous line shaped or also flat gasket 8 without interruptions is formed. After printing the gasket 8 the gasket material can be pressed, for example calendared with one or plural rollers while it is not yet completely cured. This way individual dots printed from gasket material can be shaped or connected into a gasket 8 without interruptions and/or a thickness and/or protrusions h of the gasket 8 beyond the surface or top surface 10 of the filter 1 can be calibrated or adjusted to a particular dimension. Pressing or calendaring is also feasible for the gasket 8 of FIGS. 1 and 2 which are applied with the nozzle 7.

The gasket material is for example an elastomeric material, a hard plastic material like polyamide, polyester, for technical oils for example floor silicone or as a carrier for a membrane for a fuel cell for example polypropylene. After curing of the gasket material the gasket 8 is permanently elastic. The gasket 8 is made from a technical plastic material and does not include any intentional cavities, thus it is not a foam but a permanently elastic solid material without intentional pores or similar. This applies for the printed gasket 8 and also for the gasket 8 applied with the nozzle 7.

Instead of the gasket 8 or in addition to the gasket 8 a frame, for example made from a hard plastic material can be applied to the filter 1 in the same manner as the gasket 8. The gasket 8 can also simultaneously also a frame of the filter 1. The filter 1 can also include stiffeners or struts within its surface like a frame at an edge or edges of the filter 1.

Figure 4:
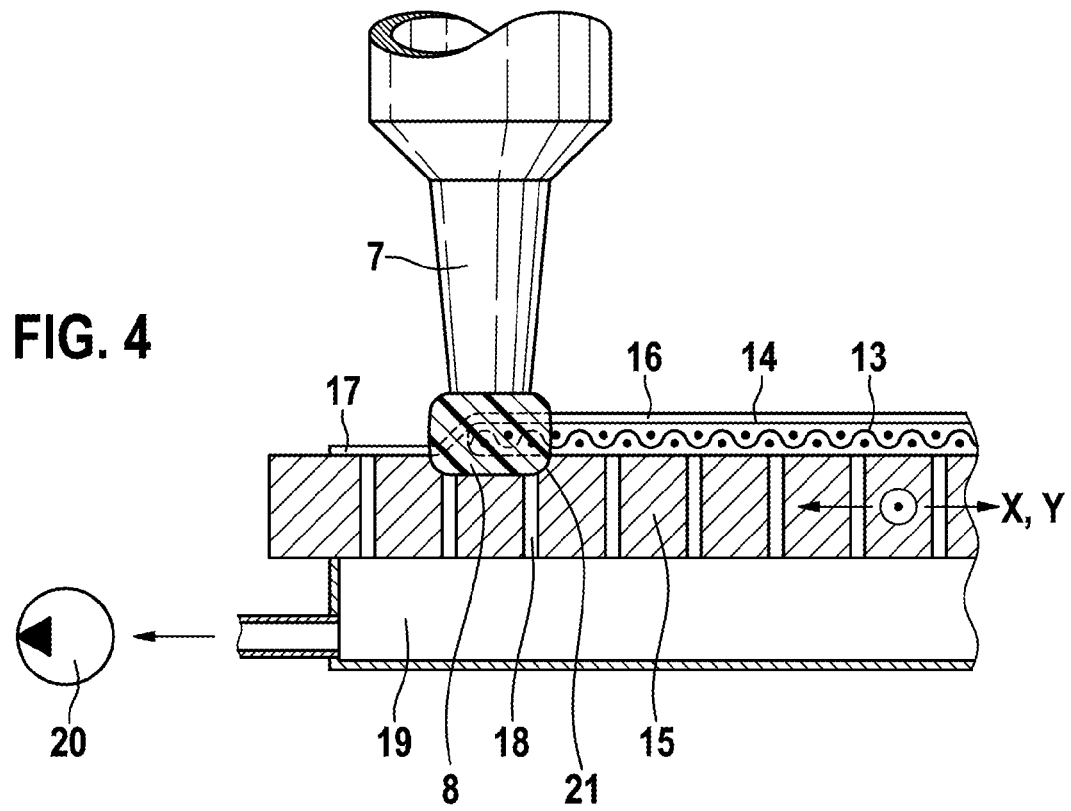
FIG. 4 illustrates a third embodiment of the invention.

FIG. 4 illustrates a fleece with fibers made from polypropylene as a carrier 13 for a membrane 14 of a non illustrated fuel cell. The fleece can also be interpreted as a filter; primarily however it is used as stated supra as a carrier for the membrane 14. The fleece forming the carrier 13 is applied to a suction table 15 that is CNC controlled and moveable in X-direction and in Y-direction, wherein the membrane 14 is applied to the fleece and a foil 16 for evacuating is applied to the membrane 14. The foil 16 overlaps the membrane 14 and the fleece 13 so that edges 17 of the foil 16 contact the suction table 15 laterally outside of the fleece and the membrane 14. The suction table 15 is penetrated by suction channels 18 and includes an evacuation chamber 19 at its bottom side through which air can be suctioned out through a vacuum pump so that the applied foil 16 sucks the membrane 14 onto the fleece forming the carrier 13. As described with respect to FIG. 1 a nozzle 7 is used to apply a plasticized gasket material along edges of the membrane 14 and of the fleece wherein the gasket material forms a line shaped permanently elastic gasket 8 after curing wherein the gasket 8 reaches around the membrane 14 and the fleece forming the carrier 13 and penetrates the fleece.

The membrane 14 is mechanically connected with the fleece through the gasket 8 and includes the gasket 8 at its edge. The foil 16 melts when the gasket material is applied so that it can be lifted off from the membrane 14 easily. Also here the gasket 8 can be applied by application with the nozzle 7 or as a matter of principle through printing in a thin layer and with a low protrusion that starts at zero and can be applied to a surface or top surface of the membrane 14 and the fleece forming the carrier 13.

Also in this embodiment the invention facilitates a gasket 8 which is thinner and/or includes a lower protrusion over the surface or top surface of the membrane 14 and carrier 13 than feasible through injection molding. When forming a carrier 13 for a membrane 14 of a fuel cell the gasket 8 is made form example from polypropylene.

In FIG. 4 a channel shaped indentation 21 is visible in the suction table 15 in the portion of the gasket 8, so that the gasket 8 also protrudes beyond the surface or top surface of the fleece forming the carrier 13 on a side that is oriented away from the nozzle 7.

The invention also facilitates to connect a multi layer filter with a gasket and/or a frame that is applied through master forming without a molding tool at the edges and/or within a surface of the filter.

What is claimed is:

1. A method for producing a filter including a gasket, the method comprising a step:
   applying the gasket to a filter material through master forming without a molding tool,
   wherein the gasket is applied to a surface of the filter material that forms an external enveloping surface of the filter,
   wherein the gasket is applied to the filter material by a nozzle, and
   wherein the nozzle is heated by a controllable enemy supply and thereby temperature controlled.

2. A method for producing a filter including a gasket, the method comprising a step:

applying the gasket to a filter material through master forming without a molding tool, wherein the gasket is applied to a surface of the filter material that forms an external enveloping surface of the filter, wherein the gasket is printed onto the filter material by letter press printing, flat printing, gravure printing, screen printing, flexo- or offset printing.

3. The method according to claim 1, wherein the filter includes a frame which is applied to the surface of the filter material that forms the external enveloping surface of the filter through master forming without a molding tool.

4. The method according to claim 1, wherein the gasket or a frame is applied at an edge of the filter and envelops the edge of the filter.

5. The method according to claim 1, wherein the filter contacts a support when the gasket or a frame is applied, wherein the support includes an indentation in a portion of the gasket or of the frame, and wherein the gasket or the frame contacts the indentation.

6. The method according to claim 1, wherein the filter supports a membrane with a permeability for a filter medium that differs from a permeability of the filter material for the filter medium.

7. The method according to claim 1, wherein the gasket or a frame have a height above the filter of up to 500 μm.

8. The method according to claim 1, wherein a flat or mono dimensionally cambered filter element is shaped into the filter by three dimensional draw forming after applying the gasket.

9. The method according to claim 1, wherein the filter includes at least one protrusion that is applied through master forming without a molding tool, and wherein the protrusion is taller than the gasket.

10. The method according to claim 1, wherein the gasket and a frame are applied at an edge of the filter and envelop the edge of the filter.

11. The method according to claim 1, wherein the filter contacts a support when the gasket and a frame is applied, wherein the support includes an indentation in a portion of the gasket and of the frame, wherein the gasket and the frame contact the indentation.

12. The method according to claim 1, wherein the gasket or a frame have a height above the filter of up to 500 μm.

13. The method according to claim 1, wherein the gasket or a frame have a height above the filter of up to 200 μm.

14. The method according to claim 1, wherein the gasket or a frame have a height above the filter of up to 20 μm.

15. The method according to claim 1, wherein the gasket and a frame have a height above the filter of up to 500 μm.

16. The method according to claim 1, wherein the gasket and a frame have a height above the filter of up to 200 μm.

17. The method according to claim 1, wherein the gasket and a frame have a height above the filter of up to 20 μm.

18. The method according to claim 1, wherein the gasket is made from a thermally cross linked synthetic material.

19. The method according to claim 1, wherein the gasket protrudes from the external enveloping surface of the filter by at least a thickness of the filter material.

* * * * *